United States Patent
Brew et al.

(10) Patent No.: US 12,030,214 B2
(45) Date of Patent: Jul. 9, 2024

(54) SKIN-FORMING DIE AND HONEYCOMB EXTRUSION DIE

(71) Applicant: CORNING INCORPORATED, Corning, NY (US)

(72) Inventors: Thomas William Brew, Corning, NY (US); Mark Allen Spetseris, Bluffton, SC (US); Eric Lee Thompson, Livonia, NY (US)

(73) Assignee: Corning Incorporated, Corning, NY (US)

( * ) Notice: Subject to any disclaimer, the term of this patent is extended or adjusted under 35 U.S.C. 154(b) by 399 days.

(21) Appl. No.: 17/293,716

(22) PCT Filed: Nov. 6, 2019

(86) PCT No.: PCT/US2019/060009
§ 371 (c)(1),
(2) Date: May 13, 2021

(87) PCT Pub. No.: WO2020/101967
PCT Pub. Date: May 22, 2020

(65) Prior Publication Data
US 2022/0001576 A1    Jan. 6, 2022

Related U.S. Application Data

(60) Provisional application No. 62/768,502, filed on Nov. 16, 2018.

(51) Int. Cl.
*B28B 3/26* (2006.01)
*B28B 3/20* (2006.01)
(Continued)

(52) U.S. Cl.
CPC .......... *B28B 3/269* (2013.01); *B01D 46/0001* (2013.01); *B01D 46/2418* (2013.01); *B01D 2279/30* (2013.01); *B28B 2003/203* (2013.01)

(58) Field of Classification Search
CPC ... B28B 3/269; B28B 2003/203; B29C 48/11; B29C 48/2566; B29C 48/25686; B29C 48/30; B29C 48/304
See application file for complete search history.

(56) References Cited

U.S. PATENT DOCUMENTS 4,381,912 A * 5/1983 Yamamoto .............. B29C 48/11
425/467
5,089,203 A   2/1992 Kragle
(Continued)

FOREIGN PATENT DOCUMENTS

CN    1478016 A    2/2004
CN   104797390 A   7/2015
(Continued)

OTHER PUBLICATIONS

Chinese Patent Application No. 201980089231.5, Office Action dated Mar. 18, 2022, 5 pages (English Translation Only), Chinese Patent Office.

(Continued)

*Primary Examiner* — Xiao S Zhao
*Assistant Examiner* — Joseph S Leyson
(74) *Attorney, Agent, or Firm* — Russell S. Magaziner

(57) ABSTRACT

A skin-forming die includes an inlet face; an outlet face; one or more slots, each of the one or more slots comprising one or more slot inlets extending between the one or more slot inlets and the outlet face; a plurality of feedholes extending between the inlet face and the one or more slot inlets; and a central opening configured to receive a matrix die. Extrusion die apparatus and methods of manufacturing honeycomb bodies are also disclosed.

10 Claims, 10 Drawing Sheets

(51) Int. Cl.
*B01D 46/00* (2022.01)
*B01D 46/24* (2006.01)

(56) References Cited

U.S. PATENT DOCUMENTS

| | | | |
|---|---|---|---|
| 5,108,685 A * | 4/1992 | Kragle | B29C 48/11 |
| | | | 428/116 |
| 5,256,054 A * | 10/1993 | Cocchetto | B28B 3/269 |
| | | | 425/467 |
| 6,455,124 B1 | 9/2002 | Beall et al. | |
| 7,914,724 B2 | 3/2011 | Bookbinder et al. | |
| 8,348,659 B2 | 1/2013 | Foster et al. | |
| 2004/0266619 A1 | 12/2004 | Bernas et al. | |
| 2007/0026188 A1 * | 2/2007 | Bookbinder | B28B 3/269 |
| | | | 428/73 |
| 2009/0028979 A1 | 1/2009 | Asaoka | |
| 2009/0028981 A1 | 1/2009 | Asaoka | |
| 2011/0052745 A1 * | 3/2011 | Corbett | B29C 48/11 |
| | | | 425/464 |
| 2011/0204544 A1 | 8/2011 | Foster et al. | |
| 2013/0285281 A1 | 10/2013 | Lehman | |
| 2015/0251347 A1 | 9/2015 | Vasquez et al. | |
| 2019/0030753 A1 | 1/2019 | Atkins et al. | |

FOREIGN PATENT DOCUMENTS

| | | | |
|---|---|---|---|
| CN | 108698252 A | 10/2018 | |
| CN | 108698253 A | 10/2018 | |
| EP | 1341650 A1 | 9/2003 | |
| KR | 10-2015-0091050 A | 8/2015 | |
| WO | 02/58925 A1 | 8/2002 | |
| WO | 2014/084871 A1 | 6/2014 | |
| WO | WO-2017040138 A1 * | 3/2017 | ......... B01D 46/0001 |
| WO | WO-2017139752 A1 * | 8/2017 | ............. B28B 3/269 |

OTHER PUBLICATIONS

International Search Report and Written Opinion of the International Searching Authority; PCT/US2019/060009; dated May 4, 2020; 9 pages; European Patent Office.

* cited by examiner

SKIN-FORMING DIE AND HONEYCOMB EXTRUSION DIE

This is a national stage application under 35 U.S.C. § 371 of International Application No. PCT/US2019/060009, filed on Nov. 06, 2019, which claims the benefit of priority under 35 U.S.C. § 119 of U.S. Provisional Application No. 62/768,502 filed on Nov. 16, 2018, the content of which is incorporated herein by reference in its entirety.

FIELD

Embodiments of the disclosure relate to honeycomb extrusion dies and extrusion apparatus, and more particularly to honeycomb dies and extrusion apparatus for extruding honeycomb structures.

BACKGROUND

Ceramic honeycomb bodies can be utilized in exhaust after-treatment systems. For example, the honeycomb bodies can be extruded from extrusion dies.

SUMMARY

Embodiments of the present disclosure provide a skin-forming die comprising a central opening configured to receive a matrix die therein.

Other embodiments of the present disclosure provide an extrusion die apparatus comprising a skin-forming die comprising a central opening and a matrix die located therein.

Other embodiments of the present disclosure provide methods for manufacturing honeycomb bodies from extrusion die apparatus comprising a skin-forming die comprising a central opening and a matrix die located in the central opening.

Another embodiment of the disclosure provides a skin-forming die. The skin-forming die comprises an inlet face; an outlet face; one or more slots, each of the one or more slots comprising one or more slot inlets, and each of the one or more slots extending between the one or more slot inlets and the outlet face; a plurality of feedholes extending between the inlet face and the one or more slot inlets; and a central opening configured to receive a matrix die.

Another embodiment of the disclosure provides an extrusion die apparatus. The extrusion die apparatus comprises a skin-forming die, comprising: a skin inlet face, a skin outlet face, one or more skin slots, each of the one or more skin slots comprising one or more skin slot inlets and extending between the one or more skin slot inlets and the skin outlet face, a plurality of skin feedholes extending between the skin inlet face and the one or more skin slot inlets, and a central opening; and a matrix die received in the central opening.

Another embodiment of the disclosure provides a method of manufacturing a honeycomb body with an extrusion die apparatus. The method comprises providing a skin-forming die, comprising: a skin inlet face, a skin outlet face, one or more skin slots, each skin slot comprising a skin slot inlet and a skin slot outlet formed into the skin outlet face, one or more skin feedholes extending between the skin inlet face and one or more skin slot inlets, and a central opening; providing a matrix die, comprising: a matrix inlet face, a matrix outlet face, a plurality of matrix slots extending between matrix slot inlets and the matrix outlet face, and a plurality of matrix feedholes extending between the matrix inlet face and the matrix slot inlets; and inserting the matrix die into the central opening of the skin-forming die. The honeycomb body can be extruded from the extrusion die apparatus.

In some embodiments, the skin-forming die body defines a narrowing portion and, optionally, an expansion portion in at least one of the skin-forming body slots. Additional features of the disclosure will be set forth in the description which follows, and will be apparent from the description, or may be learned by practice of the disclosure. It is to be understood that both the foregoing general description and the following detailed description are provide example embodiments and is intended to provide further explanation of the disclosure.

BRIEF DESCRIPTION OF THE DRAWINGS

The accompanying drawings, which are included to provide a further understanding of the disclosure and that are incorporated in and constitute a part of this specification, illustrate example embodiments of the disclosure, and together with the description, serve to explain the principles of the disclosure.

DETAILED DESCRIPTION

Figure 1:
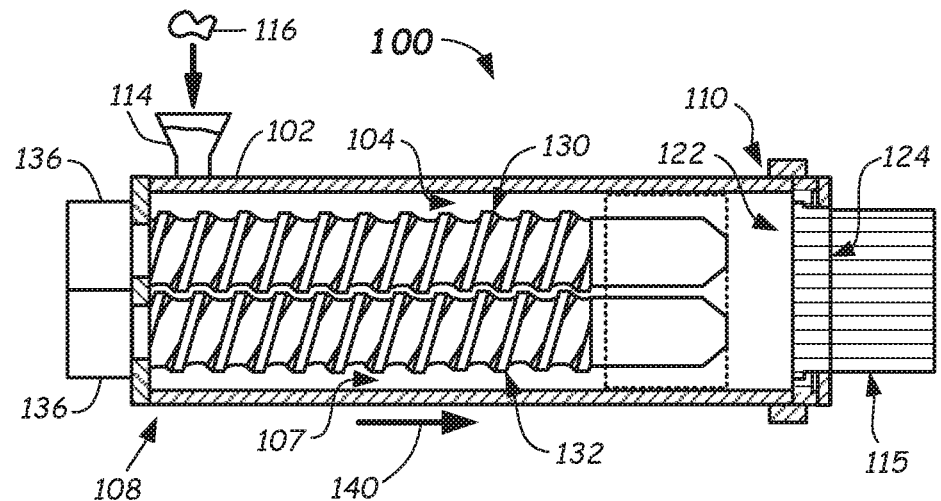
FIG. 1 schematically illustrates a side cross-sectioned side view of an extruder apparatus according to embodiments of the present disclosure.

Reference will now be made in detail to embodiments of honeycomb die apparatus and honeycomb bodies formed from the honeycomb dies. The honeycomb dies may comprise an outer skin-forming die comprising a central opening. A removable matrix die may be located in and reside within the central opening during use. The honeycomb bodies extruded from the honeycomb dies may be used, for example, to form porous ceramic honeycomb substrates, porous ceramic wall-flow diesel particulate filters, embodiments of which are illustrated in the accompanying drawings. Whenever possible, the same or like reference numerals will be used throughout the drawings to refer to the same or like parts.

Honeycomb bodies can be formed from a batch composition mixture containing inorganic and organic materials. For example, a suitable batch mixture may include ceramic particles or ceramic precursor particles, or both, organic binder, a liquid vehicle (e.g., deionized water), and optionally a rheology modifier, a pore former, and/or other additives. The body may be formed and dried. When fired, the body made from the batch composition mixture is transformed or sintered porous ceramic material, for example, a porous ceramic honeycomb body suitable for exhaust treatment purposes. The porous ceramic material of the porous ceramic honeycomb body can be cordierite, aluminum titanate, alumina, mullite, silicon carbide, silicon nitride, and the like, and combinations thereof. In some embodiments, the honeycomb bodies can be relatively non-porous ceramic honeycomb bodies, plastic-ceramic composite honeycomb bodies, or organic cellular honeycomb bodies. In some embodiments, the skin of the honeycomb bodies can be formed from a different batch mixture than the matrix of the honeycomb bodies.

The honeycomb bodies can be formed by an extrusion process wherein the batch composition mixture is extruded from an extrusion die apparatus into honeycomb bodies, which are then dried and fired to form the final ceramic honeycomb bodies. The extrusion process can be performed using the die apparatus described herein and any suitable extruder. For example, the extruder can be a hydraulic ram extrusion press, a twin-screw extruder, and the like.

Honeycomb extrusion dies in accordance with embodiments of the disclosure that can be employed to produce such honeycomb bodies can be multi-component assemblies including, for example, a skin-forming die body, a wall-forming matrix die body, and a skin-forming mask. The matrix-forming die body may incorporate batch feedholes leading to, and intersecting with, an array of discharge slots formed in the die face, through which the batch mixture is extruded. The extruded batch mixture forms an interconnecting array of crisscrossing thin cell walls forming a honeycomb extrudate in the form of a honeycomb body. A skin-forming die can comprise a central opening that is configured to receive the matrix die therein. A skin-forming mask can be employed to form an outer peripheral skin of the honeycomb body. The masks can be ring-like circumferential structures, such as in the form of a collar, defining the outer periphery of the honeycomb body. The circumferential skin layer of a honeycomb body can be co-extruded i.e. formed along with the honeycomb matrix portion comprising the intersecting walls by extruding the batch composition mixture adjacent to the outer periphery of the walls of the honeycomb matrix.

Some honeycomb bodies can comprise cordierite because cordierite exhibits a relatively low coefficient of thermal expansion (CTE) and lends itself to honeycomb extrusion. During operation and manufacturing, the honeycomb bodies are subjected to very high temperature variations. Differences in (CTE) or high CTEs in some parts of honeycomb bodies can cause the honeycomb bodies to crack when the honeycomb bodies are exposed to such high temperature variations. For example, a mismatch in CTEs between the matrix or honeycomb structure and the peripheral skin can result in stress building up during heat up and cool down phases of the manufacturing firing cycle or during product use. When the stress between the skin and the matrix exceeds the strength of the ceramic in a honeycomb body, the honeycomb body can be subject to defects, such as fissures and face cracks.

One of the factors that determines the CTE in cordierite ceramic is crystalline alignment. For example, higher skin CTE relative to matrix CTE is associated with less crystalline or a lesser degree of particle alignment in the skin compared to better crystalline or particle alignment in the matrix. This less-aligned condition of the particles in the skin can be a consequence of traditional skin-forming processes. Once a condition of poor particle alignment is attained in the skin, little can be done to change the properties of the skin compared to the matrix to lower or eliminate the stress caused by the CTE mismatch. Cordierite crystalline alignment can result from alignment of high-aspect ratio raw material particles, such as talc, during the extrusion process.

In traditional skin-forming portions of honeycomb extrusion dies, the skin flow results from matrix webs forced to flatten, crush, and coalesce under the skin-forming mask. This irregular and uncontrolled flow pattern results in local randomization of particle alignment, which gets carried out of the die and remains in the formed skin as in the form of more randomly misaligned particles. In addition, traditional skin-forming masks make use of the existing slot patterns that are designed for optimization of matrix cells. These traditional all slot patterns can result in uneven and/or irregular feeding of the skin flow around the circumference of a honeycomb extrusion die and can contribute to poor particle alignment.

The extrusion dies, die apparatus, and methods represented in FIGS. 1-12 provide increased alignment of particles of the batch mixture at the skin during extrusion, which can provide improved skin properties. Thus, the extrusion dies, die apparatus, and methods disclosed herein can provide honeycomb bodies with reduced or no skin fissures and/or improved thermal shock properties. Some extrusion dies disclosed herein comprise a skin-forming die comprising a central opening. A separate matrix die is located in the central opening, which enables separate components configured for extrusion of the skin and the matrix. The extrusion dies disclosed herein also may be able to manage wear of the skin-forming die independently of the matrix-forming die.

Reference is now made to FIG. 1, which schematically illustrates a cross-sectioned side view of an embodiment of an extruder 100 (e.g., a continuous twin-screw extruder). The extruder 100 comprises a barrel 102 comprising a first chamber portion 104 and a second chamber portion 107 formed therein and in communication with each other. The barrel 102 can be monolithic or it can be formed from a plurality of barrel segments connected successively in the longitudinal (e.g., axial) direction. The first chamber portion 104 and the second chamber portion 107 extend through the barrel 102 in the longitudinal direction between an upstream side 108 and a downstream side 110. At the upstream side 108 of the barrel 102, a material supply port 114, which can include a hopper or other material supply structure, may be provided for supplying a batch composition mixture 116 to the extruder 100. Batch composition mixture 116 A may comprise a pug of material or other small particles or globules of pre-mulled batch. A die apparatus 124 is provided at a discharge port 122 at the downstream side 110 of the barrel 102 and is configured to extrude the batch composition mixture 116 into a desired shape, such as green honeycomb extrudate 115 having the extruded shape of the honeycomb body. The die apparatus 124 may be coupled with respect to the discharge port 122 of the barrel 102, such as at an end of the barrel 102. The die apparatus 124 can be preceded by other structures, such as a generally open cavity (not shown), screen/homogenizer (not shown), or the like to facilitate the formation of a steady plug-type flow front before the batch composition mixture 116 reaches the die apparatus 124.

As shown in FIG. 1, a pair of extruder screws are mounted in the barrel 102. A first screw 130 is rotatably mounted at least partially within the first chamber portion 104 and a second screw 132 is rotatably mounted at least partially within the second chamber portion 107. The first screw 130 and the second screw 132 may be arranged generally parallel to each other, as shown, though they may also be arranged at various angles relative to each other. The first screw 130 and the second screw 132 may also be coupled to a driving mechanism outside of the barrel 102 for rotation in the same or different directions. It is to be understood that both the first screw 130 and the second screw 132 may be coupled to a single driving mechanism (not shown) or, as shown, to individual driving mechanisms 136. The first screw 130 and the second screw 132 move the batch mixture 116 through the barrel 102 with pumping and mixing action in an axial direction 140. Further supporting structure (shown dotted) can be provided to support the first screw 130 and the second screw 132 along their lengths. Such support structure can include perforations or holes therein to allow the batch composition mixture 116 to flow there through.

Figure 2:
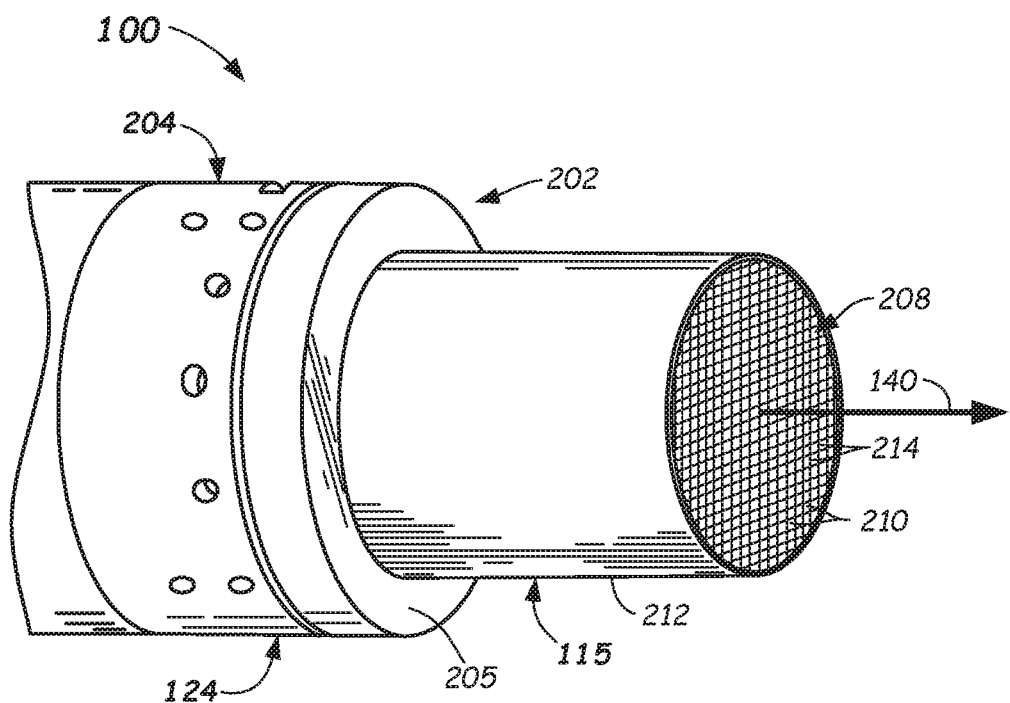
FIG. 2 schematically illustrates an isometric view of an end of an extruder apparatus and a green honeycomb extrudate being extruded therefrom according to embodiments of the present disclosure.

Reference is now made to FIG. 2, which is an isometric schematic illustration showing an end of the extruder 100 and a green honeycomb extrudate 115 being extruded therefrom. The extruder 100 is shown with an extruder front end 202 being where the batch composition mixture 116 (FIG. 1) exits the extruder 100 as the green honeycomb extrudate 115. An extruder cartridge 204 located proximate the extruder front end 202 can include extrusion hardware such as the extrusion die apparatus 124 and a skin-forming mask 205.

Figure 4:
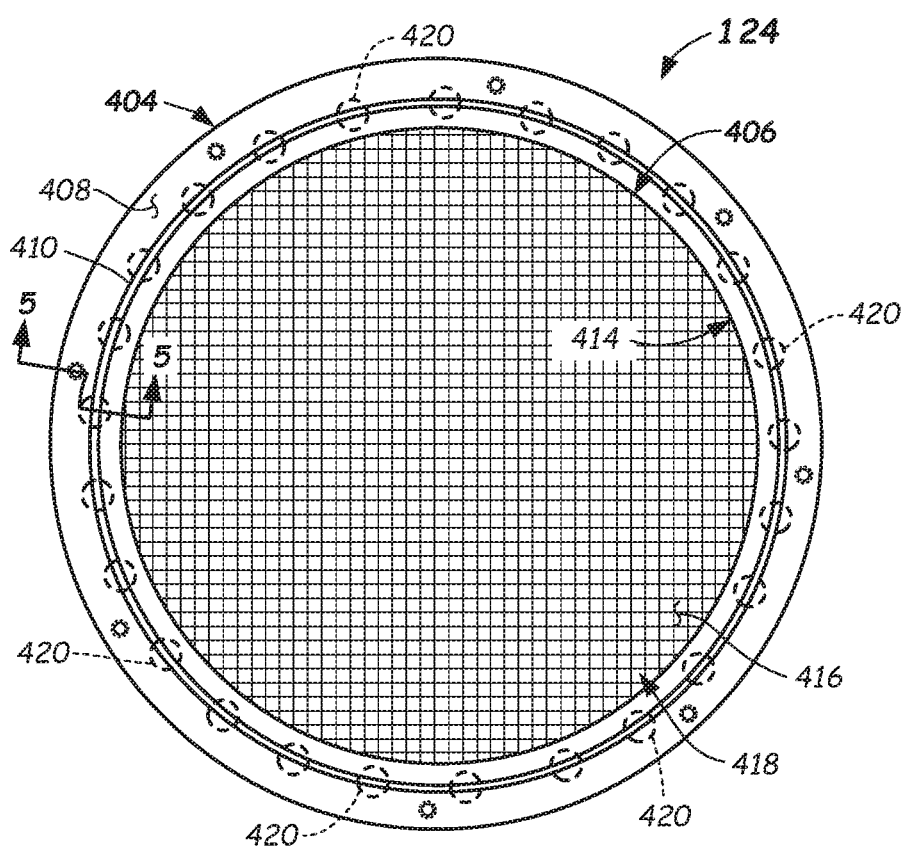
FIG. 4 schematically illustrates a front plan view of a die apparatus comprising a skin-forming die comprising a single ring skin slot, a central opening in the skin-forming die, and a matrix die located in the central opening according to embodiments of the present disclosure.

The green honeycomb extrudate 115 comprises a first end face 208 and a matrix of channels 210 formed by a matrix die (e.g., matrix die 406, FIG. 4). The green honeycomb extrudate 115 can also comprise a peripheral skin 212 formed by a skin-forming die (e.g., skin-forming die 404, FIG. 4). As described in greater detail below, the matrix die 406 may be a separate extrusion die from the skin-forming die 404. A plurality of intersecting walls 214 can form the channels 210 that extend in the axial direction 140. The cross-section of the first end face 208 of the green honeycomb extrudate 200 depicted in FIG. 2 is circular, but it can have other shapes, such as rectangular, elliptical, race-track shape, square, triangular or tri-lobed, hexagonal, octagonal, asymmetrical, symmetrical, or other desired polygonal shapes, and combinations thereof.

Figure 3:
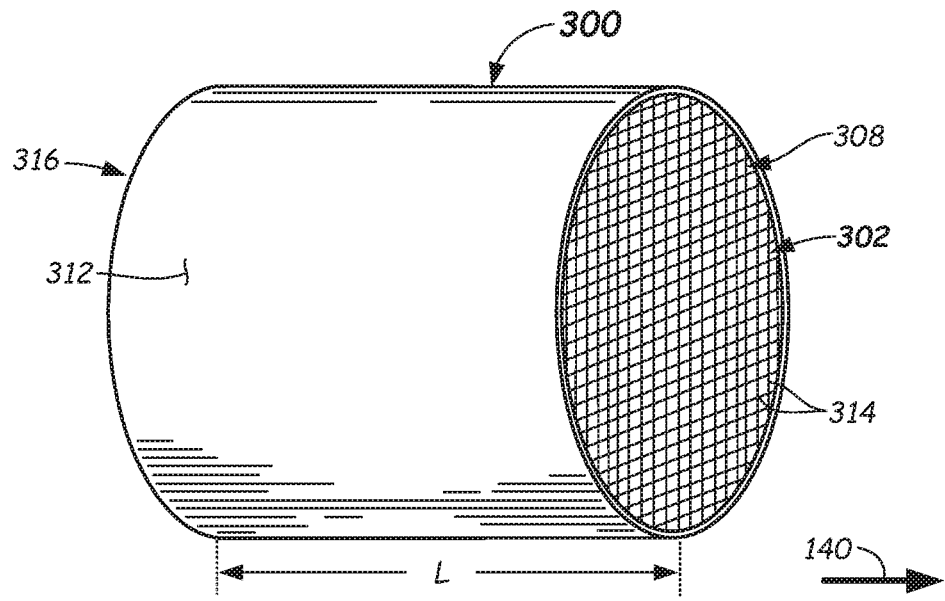
FIG. 3 schematically illustrates an isometric view of a honeycomb body according to embodiments of the present disclosure.

Upon exiting the extruder 100 in the axial direction 140, the green honeycomb extrudate 115 may stiffen and can be dried and fired to form a honeycomb body 300 as illustrated in FIG. 3. The honeycomb body 300 can comprise an inlet end 308 and an outlet end 316 located opposite the inlet end 308 and can comprise a length L31 extending between the inlet end 308 and the outlet end 316. A peripheral skin 312 of the honeycomb body 300 can extend axially between the inlet end 308 and the outlet end 316 and surround a periphery of the honeycomb matrix structure 302. The honeycomb body 300 comprises a honeycomb matrix structure 302 (e.g., a matrix) that is at least partially defined by a plurality of walls 314 extending between the inlet end 308 and the outlet end 316.

Reference is now made to FIG. 4, which illustrates a front, plan view of a die apparatus 124 with a skin-forming mask removed. The die apparatus 124 may comprise a skin-forming die 404 and a matrix die 406, which may be separate extrusion dies. The skin-forming die 404 may comprise a skin outlet face 408 and a skin slot 410 that may extend into the skin outlet face 408. A portion of the green honeycomb extrudate 115 (FIG. 2) may exit the skin slot 410 to form the peripheral skin 212 (FIG. 2). The skin-forming die 404 can comprise a central opening 414, wherein the matrix die 406 may be located (e.g., nested in and reside) in the central opening 414. The central opening 414 and the periphery of the matrix die 406 are illustrated as being circular, however, they may have virtually any shape, including rectangular, elliptical, race-track shape, square, triangular, hexagonal, octagonal, asymmetrical, symmetrical, or other desired shapes, and combinations thereof. The skin slot 410 may be in the form of a ring or ring portions that extend around the central opening 414, and thus can extrude a portion of an extrudate that forms the peripheral skin 212 (FIG. 2). The skin slot 410 is illustrated in FIG. 4 as being a continuous ring structure. In some embodiments, however, the skin slot 410 may comprise a plurality of arcuate segments closely arranged in a ring encircling the central opening 414. A number of arc segments may be used, such as 4, 8, 16, etc. In some embodiments, the skin slot 410 may be made up of arcuate corner portions and interconnecting or adjacent straight portions, such as when the outer honeycomb shape is tri-lobed or race-track shaped.

The skin-forming die 404 can be a ring-like structure independent of the matrix die 406. The matrix die 406 may comprise a conventional matrix (e.g., honeycomb) extrusion die, except that an outer surface thereof is received in or nests in the central opening 414. The skin-forming die 404 can be manufactured and fabricated independently from the matrix die 406, which enables the skin-forming die 404 to be drilled with its own pattern of skin feedholes 420 (a few labelled in FIG. 4) that is optimized for skin flow and not necessarily for matrix geometry constraints. In addition, the skin feedholes 420 can feed batch to the skin slot 410 and into one or more discrete flow channels (e.g., flow channel 526, FIG. 5) that can deliver skin flow directly under a skin-forming mask (e.g., skin-forming mask 205, FIG. 5) and towards the outlet of the skin-forming die 404. This flow from the slot 410 through the discrete flow channel may eliminate irregular flow patterns resulting in poor particle alignment in traditional skin-forming masks and flow patterns. In addition, the discrete flow path can include a funnel or divot (described further below), which can further optimize alignment of particles in the skin flow before exiting the skin-forming die 404.

The matrix die 406 may comprise a matrix outlet face 416 comprising a plurality of matrix slots 418 extending into the matrix outlet face 416. The intersecting walls 214 (FIG. 2) of the green honeycomb extrudate 115 (FIG. 2) exit the arrangement of interconnected matrix slots 418 to form the honeycomb structure of the green honeycomb extrudate 115, as well as for the honeycomb bodies subsequently cut from the extrudate. The matrix slots 418 depicted in FIG. 4 extend perpendicular to each other forming rectangular-shaped (e.g., square) die pins. However, the matrix die 406 is not limited to such an arrangement of matrix slots 418. For example, the matrix die 406 may comprise virtually any arrangement of matrix slots 418, including triangular slot patterns, hexagonal slot patterns, diamond patterns, discontinuous slot patterns, as well as combination patterns such as octa-square patterns, hexa-diamond patterns, and other arrangements of matrix slots 418. A plurality of feedholes (e.g., matrix feedholes 542, FIG. 5) may feed a batch composition mixture to the matrix slots 418 during extrusion.

Figure 5:
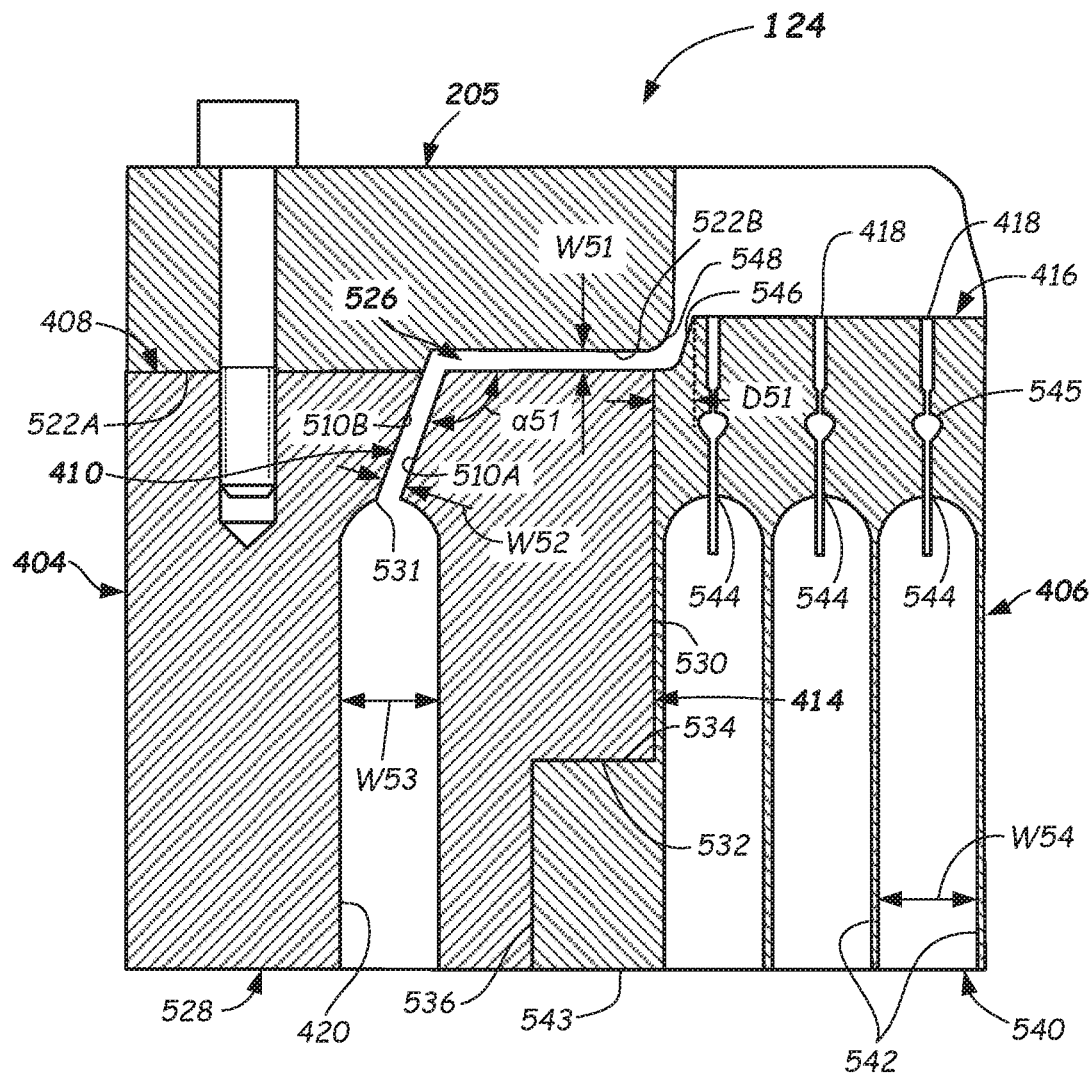
FIG. 5 schematically illustrates a partial, cross-sectioned side view of the die apparatus of FIG. 4 comprising a skin-forming die having a central opening, a matrix die located in the central opening, and a skin-forming mask according to embodiments of the present disclosure.

Reference is now made to FIG. 5, which schematically illustrates a partial cross-sectioned side view of the extrusion die apparatus 124 comprising the skin-forming die body 404, the matrix die body 406, and a skin-forming mask 205 coupled to the skin-forming die 404. The skin-forming mask 205 may comprise a first lower surface 522A and a second lower surface 522B. The first lower surface 522A may be located adjacent to and against the skin outlet face 408 of the skin-forming die 404. The interface between the skin outlet face 408 and the first lower surface 522A may comprise a seal or the like (not shown) or a precision fit that prevents batch composition mixture 116 from seeping between the skin outlet face 408 and the first lower surface 522A. The second lower surface 522B may be recessed relative to the first lower surface 522A and may together with the skin outlet face 408 form a flow channel 526 when the skin-forming mask 205 is located against the skin-forming die 404. Batch composition mixture 116 (FIG. 1) flows through the flow channel 526 during the extrusion process to form the peripheral skin 212 (FIG. 2) of the green honeycomb extrudate 115. The flow channel 526 may have a channel width W51 (e.g., transverse dimension) measured transversely between the skin outlet face 408 and the second lower surface 522B. The channel width W51 may be the same thickness as the peripheral skin 212 of the green honeycomb extrudate 115. In some embodiments, the channel width W51 may be in the range of 0.009 to 0.013 inches (0.23 to 0.33 mm). In other embodiments, the channel width W51 may be about 3 to 5 times the wall thickness, for example. Other channel widths W51 may be used.

The skin slot 410 may comprise an inner side 510A and an outer side 510B. A skin slot width W52 (transverse dimension) may be measured transversely and perpendicularly between the inner side 510A and the outer side 510B, as shown. The skin slot width W52 may be the same thickness as the peripheral skin 212 (FIG. 2). In some embodiments, the skin slot width W52 may be in the range of 0.009 inch to 0.013 inch (0.23 mm to 0.33 mm). However, in some embodiments, the skin slot 410 and/or the flow channel 526 may have widths W51, W52 in the range of 0.007 inch to 0.018 inches (0.18 mm to 0.46 mm). In the embodiment depicted in FIG. 5, the skin slot width W52 and the channel width W51 may be the same. A flow angle α51 may be located where the skin slot 410 intersects the skin outlet face 408. The flow angle α51 may be measured between the inner side 510A or the outer side 510B of the skin slot 410 and an axis extending radially inward on the skin outlet face 408 toward a center of the central opening 414. The flow angle α51 may be greater than 90 degrees and less than 180 degrees, and more specifically, the flow angle may range between 108 degrees and 130 degrees. Too steep (near 90 degrees) and too much batch flow loss is induced, whereas too large (towards 180 degrees) increases the die footprint and material and manufacturing cost.

One of several skin feedholes 420 is schematically illustrated in FIG. 5 and may be representative of all the skin feedholes 420 (FIG. 4). The skin feedhole 420 may be a circular hole in transverse cross-section and may extend between a skin inlet face 528 of the skin-forming die 404 and a skin slot inlet 531 to the skin slot 410. The skin feedhole 420 may have a transverse feedhole width W53 (transverse dimension), which may be a value dependent at least on the number of skin feedholes 420 located within the skin-forming die 404. The feedhole widths W53 and number of skin feedholes 420 may be selected to provide and even flow of batch composition mixture 116 to form the peripheral skin 212 (FIG. 2).

The skin-forming die 404 may comprise an inner wall 530 (e.g., a skin wall) defining a periphery of the central opening 414. The inner wall 530 may comprise a skin ledge 532 or other restraining feature configured to contact a matrix ledge 534 or other restraining feature on an outer wall 536 (e.g., matrix wall) of the matrix die 406. The contact between the skin ledge 532 and the matrix ledge 534 may restrain and prevent the matrix die 406 from moving forward during the extrusion process. In some embodiments, the restraining features may be embodied wherein the inner wall 530 may comprise a skin taper and the outer wall 536 may comprise a matrix taper that interface to nest the matrix die 406 in the central opening 414 of the skin-forming die 404.

The matrix die 406 may comprise a matrix inlet face 540 located opposite the matrix outlet face 416. In some embodiments, the matrix inlet face 540 may be on or proximate a plane defining the skin inlet face 528 of the skin-forming die 404. A plurality of matrix feedholes 542 may extend between the matrix inlet face 540 and inlets 544 to the matrix slots 418. The matrix feedholes 542 may have transverse matrix feedhole widths W54 (transverse dimensions) measured transversely across the matrix feedholes 542. In some embodiments, the widths W54 may be in a range from 0.04 inch to 0.10 inch (1.02 mm to 2.54 mm). As shown in FIG. 5, one or more of the matrix slots 418 may comprise a divot 545 to improve batch flow therein.

The matrix die 406 may comprise a ramp 546 located at the end of the flow channel 526. The skin-forming mask 205 may comprise a similar ramp feature 548, which maintains the channel width W51 as a constant width. The ramp 546 enhances knitting between batch mixture extruded from the skin-forming die 404 and batch mixture extruded from the matrix die 406. A setback distance D51 may be formed into the matrix die 406 to further enhance knitting of the batch mixtures. In some embodiments, the setback distance D51 is in the range of from 0.003 inch to 0.057 inch (0.07 mm to 1.45 mm). In other embodiments, the setback distance D51 is about 0.045 inch (1.14 mm).

During extrusion, the batch mixture may be forced against the skin inlet face 528 and against the matrix inlet face 540. In some embodiments, the batch mixture supplied to the skin inlet face 528 and the matrix inlet face 540 can be different batch mixtures. The batch mixture flows into the matrix feedholes 542 and to the matrix slots 418 where it is extruded from the matrix outlet face 416 as a honeycomb structure or honeycomb matrix (e.g., comprising intersecting walls 214, FIG. 2) based on the arrangement of the matrix slots 418. Simultaneously, the batch mixture may flow into the skin feedholes 420 and into the skin slot 410. The batch mixture then flows out the skin outlet face 408 and through the flow channel 526. The batch mixture may knit with the batch mixture from the matrix die 406 as it forms the peripheral skin 212 (FIG. 2).

As shown above, the flow of batch mixture forming the peripheral skin 212 may not mix with the batch mixture in the matrix die except for knitting purposes. The flow of the peripheral skin batch mixture from the skin slot 410, through the flow channel 526, and to the ramp 546 may be referred to as a discrete path. The discrete flow path eliminates the irregular flow patterns produced of traditional skin-forming portions of traditional dies with crisscrossing slot portions that results in poor particle alignment in the skin 212. In addition to the foregoing, the independent, separate skin-forming die 404 enables the skin feedhole widths W53 to be sized and spaced to optimize particle alignment and the flow of the batch mixture for forming the peripheral skin. The skin slot 410 and the flow channel 526 may be long and narrow, which creates a long, resistive pathway for the batch mixture to flow and creates a significant pressure drop. Since a similar pressure drop between the skin batch flow and matrix batch flow may be achieved in order to prevent defects, the diameter, length and spacing of the skin feedholes 420 can be used to compensate for the resistance in the skin slot 410.

Figure 6:
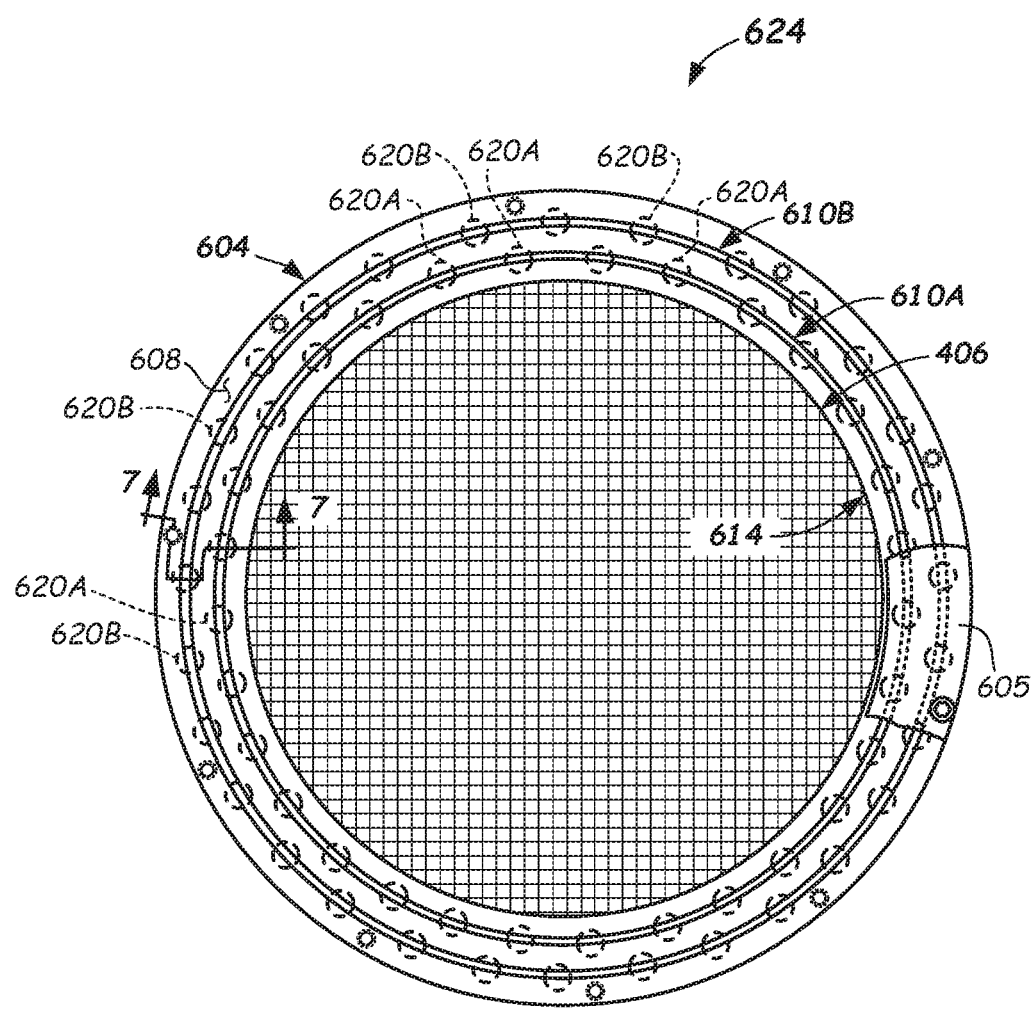
FIG. 6 schematically illustrates a front, plan view of a die apparatus comprising a skin-forming die comprising two rings of skin slots, a central opening in the skin-forming die, and a matrix die residing in the central opening according to embodiments of the present disclosure. A portion of the skin-forming mask is removed for illustration purposes.

Reference is now made to FIG. 6, which illustrates a die apparatus 624 comprising a skin-forming die 604 comprising a first skin slot 610A (inner skin slot) and a second skin slot 6106 (outer skin slot) extending into a skin outlet face 608. The first skin slot 610A and the second skin slot 610B may be arranged as rings or rows of aligned slot segments making up a ring-shaped skin slot, wherein the first skin slot 610A is closer to the central opening 614 than the second skin slot 610B. The first skin slot 610A and/or the second skin slot 610B may be continuous slots (as shown). Accordingly, the skin-forming die 604 may comprise nested, continuous slots 610A, 610B encircling the central opening 614. As described in greater detail below, the first skin slot 610A and the second skin slot 610B may generate a laminar flow of batch mixture at the exit of the flow channel, which substantially aligns the particles in the peripheral skin 212 (FIG. 2). The first skin slot 610A may be coupled to first feedholes 620A (a few labelled and shown) and the second skin slot 610B may be coupled to second feedholes 620B (a few labelled and shown). The first skin slot 610A and the second skin slot 610B are illustrated as being concentric, continuous, annular rings. In some embodiments, at least one of the first skin slot 610A or the second skin slot 610B can comprise a plurality of arcuate segments arranged end to end in a ring-like pattern around the central opening 614. A small gap (e.g., a few mm or less) may be present between the segments. Other embodiments of the skin-forming die 604 may include more than two skin slots. A portion of a skin-forming mask 605 that can be coupled to the skin-forming die 604 is shown in FIG. 6. The matrix die 406, which can be identical as shown in FIG. 5, is received in the skin-forming die 604.

Figure 7:
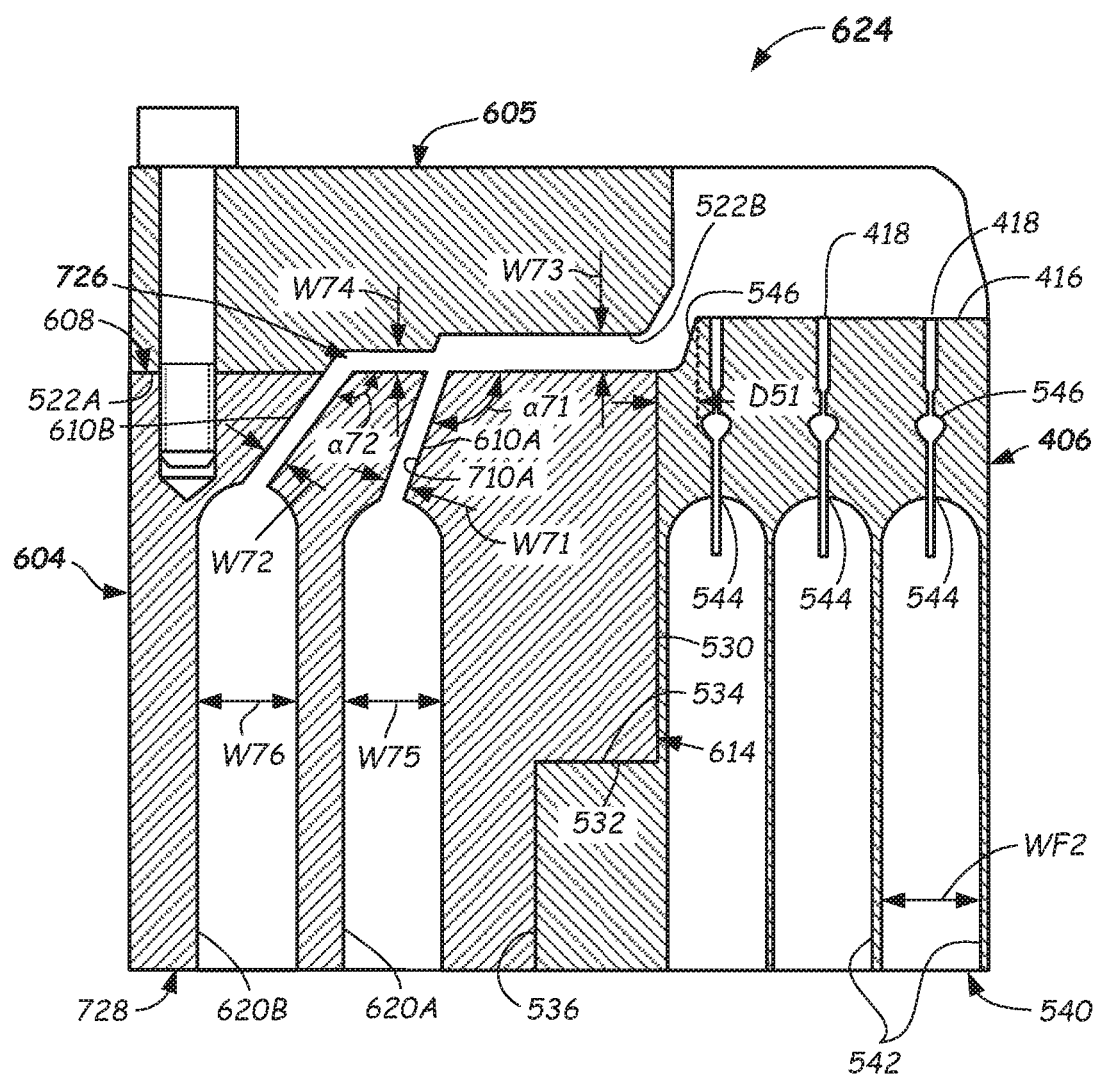
FIG. 7 schematically illustrates a partial, cross-sectioned side view of the die apparatus of FIG. 6 comprising a skin-forming mask according to embodiments of the present disclosure.

Additional reference is made to FIG. 7, which illustrates a cross-sectioned side view of the die apparatus 624 comprising the skin-forming mask 605, the skin-forming die 604, and the matrix die 406. The first skin slot 610A intersects the skin outlet face 608 at a first flow angle α71 and the second skin slot 6106 intersects the skin outlet face 608 at a second flow angle α72. The first and second flow angles α71 and α72 may be measured between a respective side (e.g., side 710A) of the at least one inner slot (e.g., first skin slot 610A) and a corresponding side of the at least one outer slot (e.g., second skin slot 610B) and an axis extending radially inward on the skin outlet face 608 to a center of the central opening 614. In some embodiments, the angle α72 can be greater than the angle α71. Optionally, they may be equal. In some embodiments, the flow angles α71 and α72 may be in the range of 90 degrees to 180 degrees, or even from 108 degrees to 130 degrees in order to minimize flow losses and reduce material and manufacturing cost. The first skin slot 610A may have a width W71 (e.g., transverse dimension) and the second skin slot 610B may have a width W72 (e.g., transverse dimension). In some embodiments, the width W71 can be equal to the width W72. In some embodiments, the width W71 can be equal to the width W72 and the channel width W73 of flow channel 726 downstream of the first skin slow exit to the flow channel 726 is equal to approximately twice the width W71 or twice the width W72. The width of the flow channel 726 may be narrow up until the point where the first skin slot 610A joins the flow channel 726. For example, the width W74 may be less than the width W73. In other embodiments, the width W74 may be equal to the width W72.

The first feedhole 620A and the second feedhole 620B may be representative of all the first feedholes 620A and all the second feedholes 620B depicted in FIG. 6. The first feedhole 620A may have a width W75 (e.g., transverse dimension) and the second feedhole 620B may have a width W76 (e.g., transverse dimension). In some embodiments, the width W75 is equal to the width W76. In some embodiments, the width W76 can be greater than the width W75 to compensate for the additional pressure drop or flow resistance resulting from the longer distance the batch mixture travels from the skin inlet face 728 to the ramp 546. The first feedhole 620A and the second feedhole 620B may intersect the skin inlet face 728 at different flow angles. In some embodiments, the first feedhole 620A and the second feedhole 620 B may intersect the skin inlet face 728 at flow angles in the range of from 90 degrees to 45 degrees, or flow angles in the range of from 80 degrees to 55 degrees, for example. Although not shown, in some embodiments, the first feedhole 620A and the second feedhole 620 B may intersect the skin inlet face 728 at angles that are the same as the angles α71 and α72. The width W73 of the flow channel 726 can be as described in FIG. 5, and the widths W71 and W72 can be chosen to balance flow.

The first skin slot 610A and the second skin slot 610B form the peripheral skin 212 (FIG. 2) by joining two layers of batch mixture together in the flow channel 726 before the layers exit the skin-forming die 604 at the ramp 546. The layers of batch mixture formed by each of the first skin slot 610A and the second skin slot 610B may be thin and elongated along the die face 608, and are joined in the flow channel 726, which achieves better particle alignment. The alignment of the particles is maintained as the layers of batch mixture are laminated together through long flow paths, which in turn forms the peripheral skin 212 with highly aligned particles. The particle alignment reduces the CTE in the peripheral skin 212, which makes the peripheral skin 212 less likely to crack.

Figure 8:
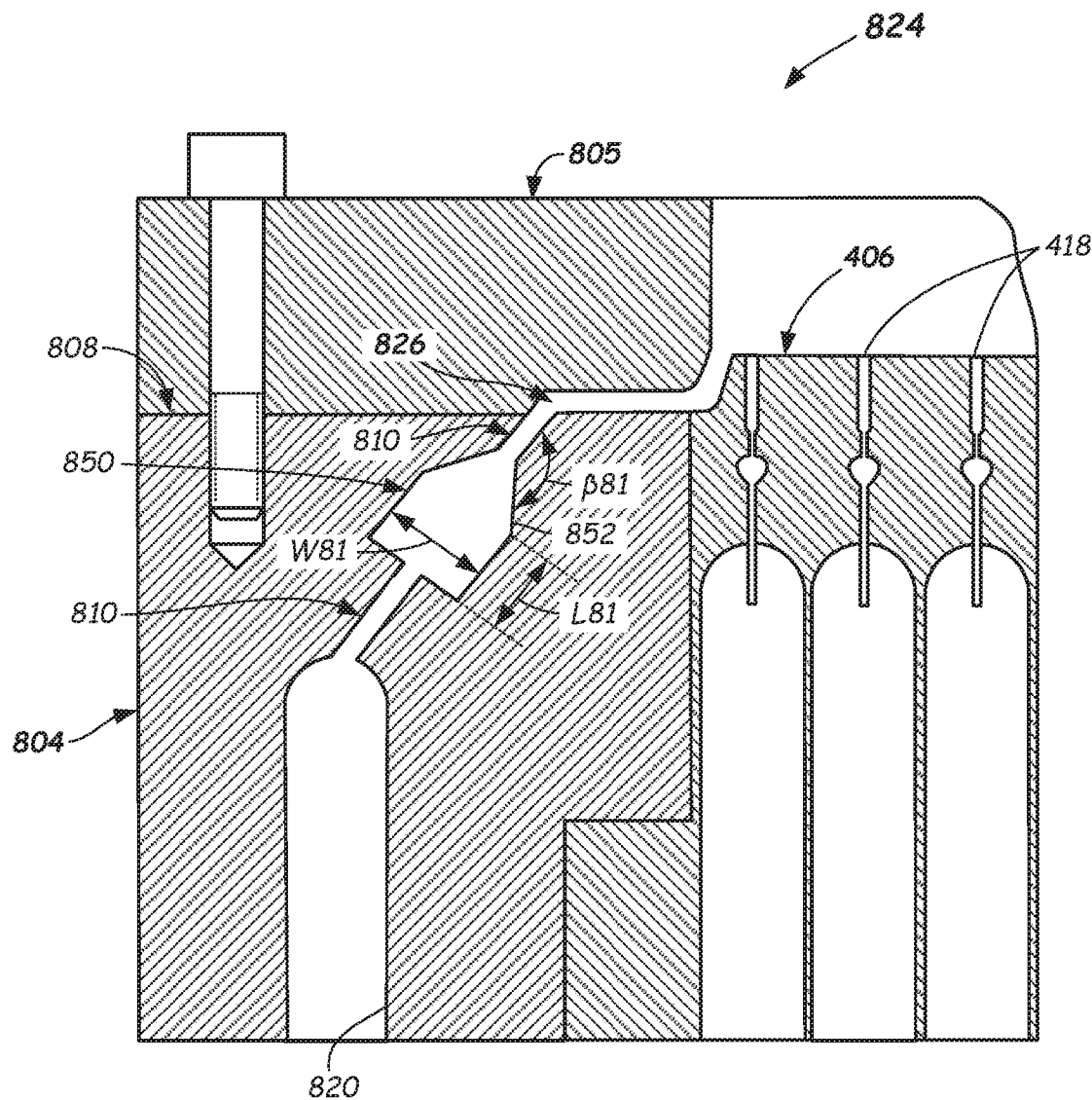
FIG. 8 schematically illustrates a cross-sectioned view of a die apparatus comprising a divot in a skin slot according to embodiments of the present disclosure.

Reference is now made to FIG. 8, which schematically illustrates a cross-sectioned view of a die apparatus 824 comprising a skin-forming die 804, a matrix die 406, and a skin-forming mask 805. The skin-forming die 804 can comprise a skin slot 810 comprising a divot 850. The divot 850 (dimensions shown exaggerated) may serve to smooth local feed variations associated with individual feedholes to the skin slot 810 resulting in more uniform extruded skin flow and velocity. A downstream side of the divot 850 may comprise a funnel 852 having a shape that tapers toward the skin outlet face 808. The relative steepness of the funnel 852 can be defined by a contraction angle β81. The funnel 852 may serve to align the particles (e.g., high aspect ratio particles) in the batch mixture before the batch mixture enters the portion of the skin slot 810 proximate the skin outlet face 808 and the flow channel 826 formed between the skin-forming mask 805 and the skin outlet face 808. In some embodiments, the skin feedhole 820 may couple directly to the divot 850 without coupling to the lower portion of the skin slot 810. In the embodiment illustrated in FIG. 8, a portion of the skin slot 810 between the funnel 852 and the skin outlet face 808 may balance the pressure drop between skin flow of batch mixture and the matrix flow of batch mixture. In some embodiments, the divot 850 may have a width W81 at its widest cross-section. The tapered portion of the divot 850 may have a length L81. In some embodiments, the width W81 may be in a range from 0.05 inch to 0.07 inch (1.27 mm to 1.78 mm). In other embodiments, the width W81 may be about 0.06 inch (1.52 mm). In some embodiments, the length L81 may in a range from 0.05 inch to 0.15 inch (1.27 mm to 3.81 mm). In other embodiments, the length L81 may be about 0.10 inch (2.54 mm). The contraction angle β81 may be in a range from 112 degrees to 165 degrees. In other embodiments, the contraction angle β81 may be about 135 degrees. The obtuse angle between the slot 810 and the flow channel 826 may be between 120 and 160 degrees. The width of the flow channel 826 and the width of the skin slot 810 can be as described in FIG. 5.

Figure 9:
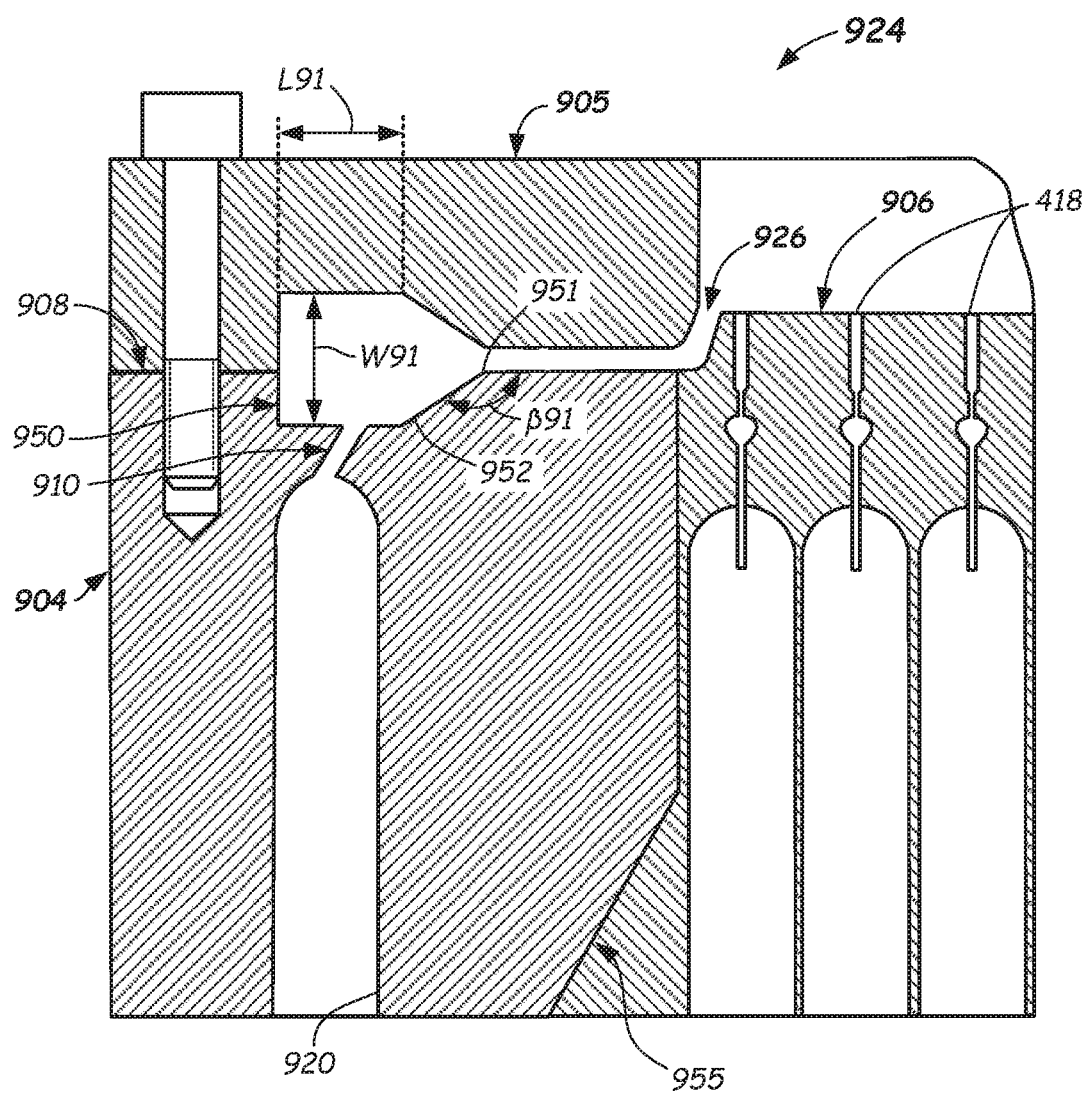
FIG. 9 schematically illustrates a partial, cross-sectioned side view of a die apparatus comprising a reservoir formed between a skin-forming mask and a skin-forming die according to embodiments of the present disclosure.

Reference is now made to FIG. 9, which schematically illustrates a partial, cross-sectioned side view of a die apparatus 924 comprising a reservoir 950 formed between a skin-forming mask 905 and a skin-forming die 904. The skin-forming die 904 may comprise one or more reservoirs 950. The reservoir 950 may serve to smooth local feed variations associated with individual feedholes 920 and the slot 910 resulting in more uniform extruded skin flow and velocity. As shown in FIG. 9, the reservoir 950 may comprise a reservoir outlet 951 extending onto the flow channel 926 of the skin-forming die 904. The reservoir 950 may comprise a funnel 952 that tapers toward the reservoir outlet 951 and the flow channel 926 at a contraction angle β91. The contraction angle β91 can be between 112 degrees and 165 degrees, for example. The reservoir 950 may have a reservoir inlet at the outlet of the slot 910. The reservoir 950 may include a width W91 (e.g., a transverse dimension) and the reservoir 950 may have a length L91. The width W91 may be in a reservoir first portion that has a transverse dimension that is greater than a smallest transverse dimension of the funnel 952, which may constitute a reservoir second portion within the funnel 952. The dimensions of the reservoir 950 and the funnel 952 aid with alignment of the particles before they enter the flow channel 926. In the depicted embodiment of FIG. 9, the retaining feature between the skin-forming die 904 and the matrix die 906 comprises a tapered section 955. The included taper angle formed on the funnel 952 of the matrix die 906 may comprise between about 25 degrees and 65 degrees, for example. In some embodiments, the width W91 may be in a range from 0.05 inch to 0.07 inch (1.27 mm to 1.78 mm). In some embodiments, the length L91 may in a range from 0.05 inch to 0.15 inch (1.27 mm to 3.81 mm). The width of the flow channel 926 and the width of the skin slot 910 can be as described in FIG. 5. Other suitable widths, lengths, and contraction angles may be used.

Figure 10:
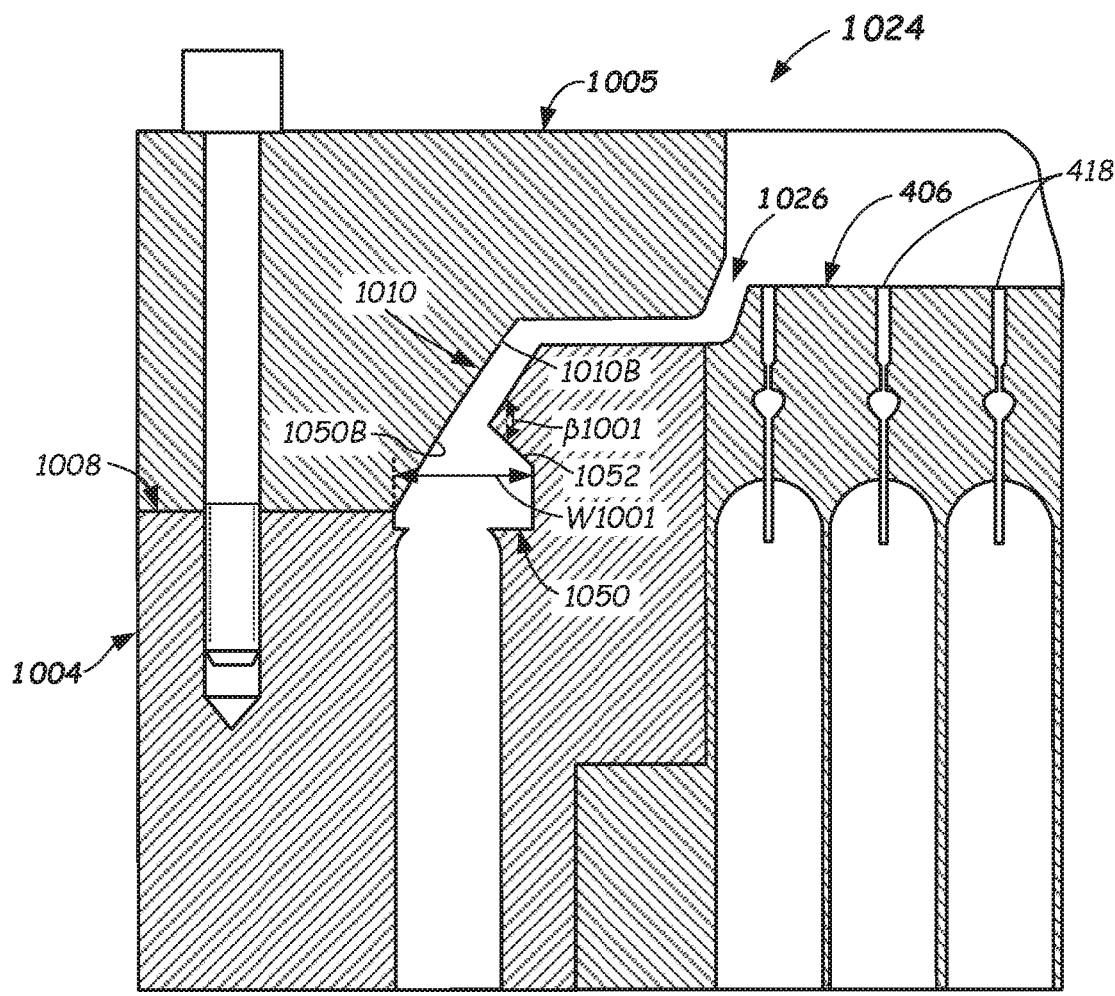
FIG. 10 schematically illustrates a partial, cross-sectioned side view of a die apparatus comprising a skin-forming mask forming an outer wall of a reservoir according to embodiments of the present disclosure.

Reference is now made to FIG. 10, which schematically illustrates a partial, cross-sectioned side view of a die apparatus 1024 comprising a skin-forming die 1004, a matrix die 406, and a skin-forming mask 1005. The skin-forming mask 1005 may form an outer wall 10506 of a divot 1050. The divot 1050 may serve to smooth local feed variations associated with individual feedholes to the skin slot 1010 resulting in more uniform extruded skin flow and velocity. The skin-forming mask 1005 may also form an outer wall 10106 of the skin slot 1010. The divot 1050 may include a funnel 1052, wherein a transition angle β1001 is located between the funnel 1052 and the skin slot 1010. As with other reservoirs and divots, the funnel 1052 tapers the divot 1050 toward the skin slot 1010 and the skin outlet face 1008, which aligns particles in the batch mixture. The particles remain aligned during flow through the flow channel 1026. The divot 1050 may be coupled directly to the feedhole 1020. The divot 1050 may include a width W1001 (e.g., transverse dimension) at its widest portion. In some embodiments, both the width W1001 and the length of the skin slot 1010 may be in the range from 0.05 inch to 0.07 inch (1.27 mm to 1.78 mm). In other embodiments, the width W1001 and the length of the skin slot 1010 may be about 0.06 inches (1.52 mm). In some embodiments, the length of the outer wall 1010B may in a range from 0.08 inch to 0.14 inch (2.0 mm to 3.6 mm). In other embodiments, the length of the outer wall may be about 0.11 inch (2.8 mm). The transition angle β1001 may be in a range from 112 degrees to 165 degrees. The obtuse angle between the slot 1010 and the flow channel 1026 can be greater than 90 and less than 180, or between 108 and 130 degrees, for example. The width of the flow channel 1026 and the width of the skin slot 1010 can be as described in FIG. 5.

Figure 11:
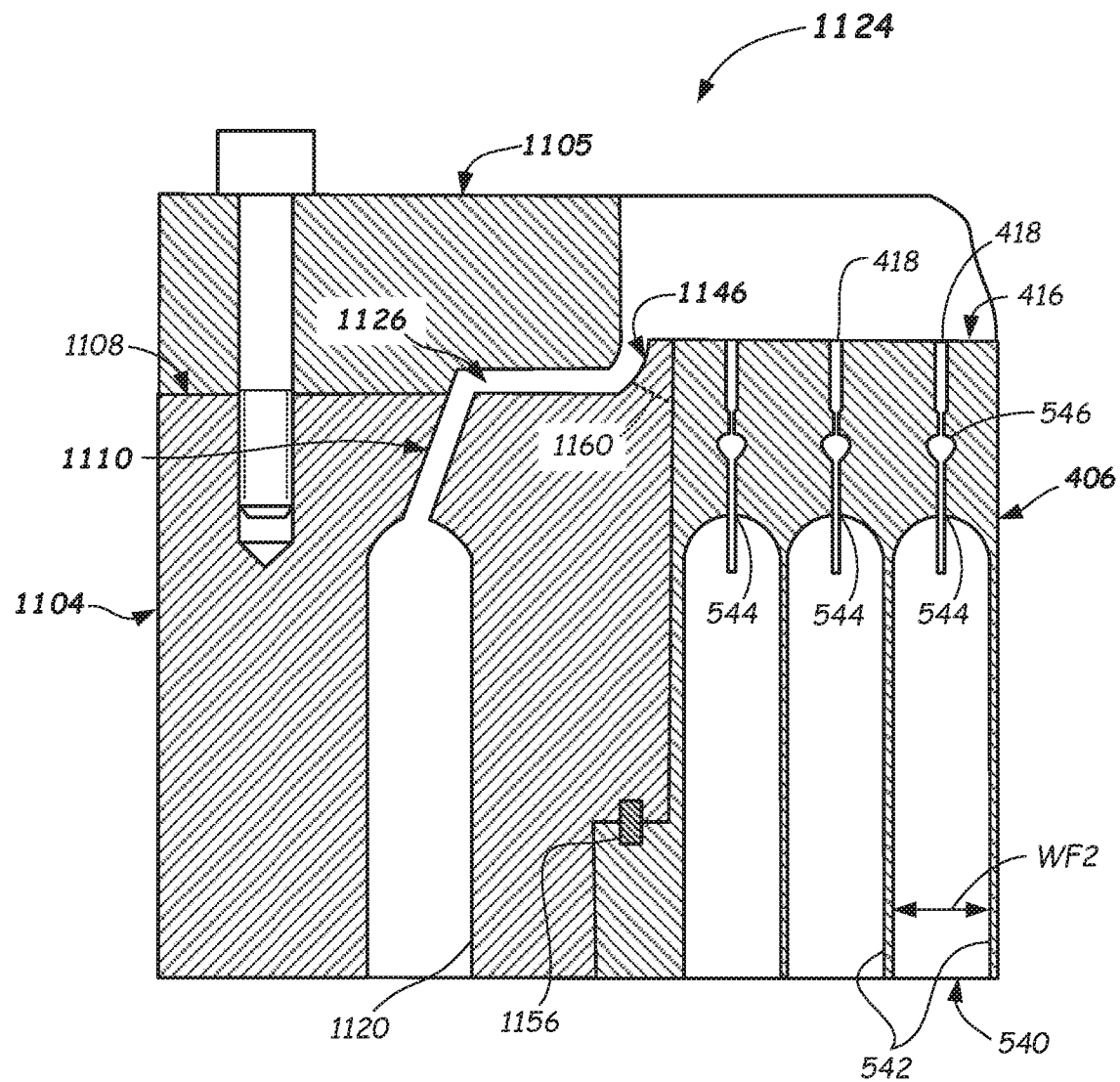
FIG. 11 schematically illustrates a partial, cross-sectioned side view of a die apparatus comprising a skin-forming ramp integral with a skin-forming die according to embodiments of the present disclosure.

Reference is now made to FIG. 11, which schematically illustrates a die apparatus 1124 comprising a skin-forming ramp 1146 (e.g., an angled surface) and the slot 1110 integral with a skin-forming die 1104 and forming a portion of the flow channel 1126. The die apparatus 1124 may extend the operating lifetime of the matrix die 1106 in that wear on the skin-forming ramp 1146 may cause replacing the skin-forming die 1104 rather than the matrix die 1106. The skin-forming ramp 1146 may include slots therein that are aligned with the matrix slots 418 to provide knitting of the matrix and the peripheral skin 212 (FIG. 2). For example, a side-extending or radially-extending slot 1160 may extend between the ramp 1146 of the skin-forming die 1104 and the matrix die 1106. Manufacturing the die apparatus 1124 may comprise assembling the matrix die 1106 and the skin-forming die 1104 together and performing an EDM plunge to create halo peripheral slots. The EDM plunge may extend into the skin-forming die 1104, such as by a distance of about 0.045 inches (1.14 mm). Thus, slots in both the skin-forming die 1104 and the matrix die 406 are simultaneously formed and are aligned. In some embodiments, the slot 1160 can be separately formed via abrasive wire slotting or EDM, and may be wider than the slots in the matrix die 1106. The slots 1160 may extend into the skin-forming die 1104, such as by a distance of about 0.045 inch (1.14 mm). Thus, slots in both the skin-forming die 1104 and the matrix die 1106 are simultaneously formed and are aligned. Alignment devices 1156, such as dowels, can be used to maintain the rotational alignment between the skin-forming die 1104 and the matrix die 1106. In the embodiment of FIG. 11, the skin outlet surface 1108 has stepped portions to match similar stepped portions in the skin-forming mask 1105 to form the flow channel 1126. The die apparatus 1124 may also include a divot or reservoir as shown in FIGS. 8-10. The obtuse angle between the slot 1110 and the flow channel 1126 can be greater than 90 and less than 180, or between 108 and 130 degrees, for example. The width of the flow channel 1126 and the width of the skin slot 1110 can be as described in FIG. 5.

Figure 12:
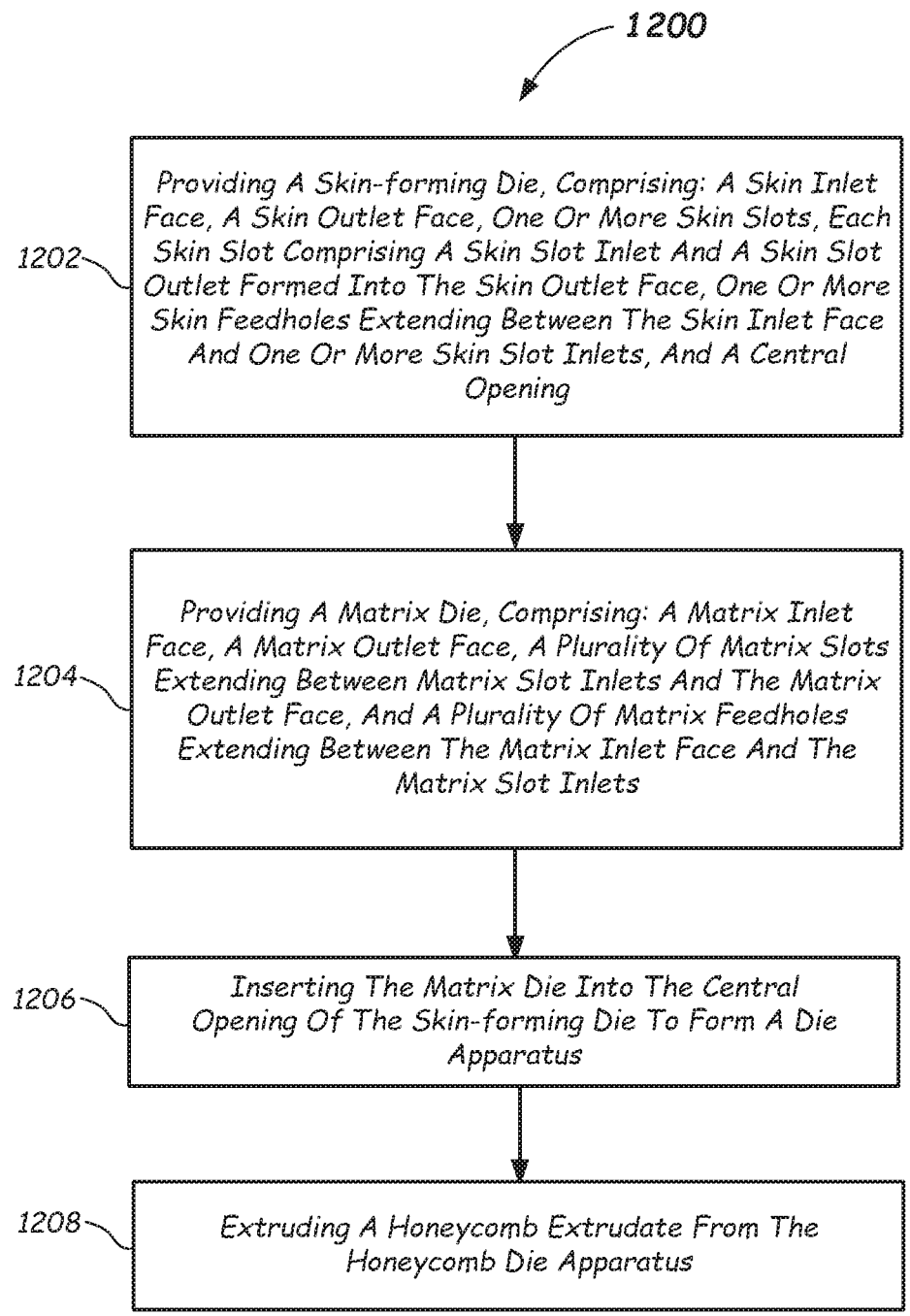
FIG. 12 illustrates a flowchart describing a method of making a honeycomb body according to embodiments of the present disclosure.

In another embodiment of the disclosure, a method of manufacturing a honeycomb body (e.g., honeycomb body 300) is provided as shown by a flowchart 1200 of FIG. 12. The method may comprise, in 1202, providing a skin-forming die (e.g., skin-forming die 404, etc.), comprising: a skin inlet face (e.g., skin inlet face 528, etc.), a skin outlet face (e.g., skin outlet face 408, etc.), one or more skin slots (e.g. skin slot 410, etc.), each skin slot comprising a skin slot inlet (e.g., skin slot inlet 531) and a skin slot outlet formed into the skin outlet face, one or more skin feedholes (e.g., skin feedholes 420, etc.) extending between the skin inlet face and one or more skin slot inlets, and a central opening (e.g., central opening 414). The method may comprise, in 1204, providing a matrix die (e.g., matrix die 406, etc.), comprising: a matrix inlet face (e.g., matrix inlet face 540, etc.), a matrix outlet face (e.g., matrix outlet face 416), a plurality of matrix slots (e.g., matrix slots 418) extending between matrix slot inlets (e.g., inlets 544) and the matrix outlet face, and a plurality of matrix feedholes (e.g., matrix feedholes 542) extending between the matrix inlet face and the matrix slot inlets. The method 1200 may further comprise, in 1206, inserting the matrix die into the central opening of the skin-forming die to form a honeycomb extrusion die. The method 1200 may further comprise, in 1208, extruding a honeycomb extrudate (e.g., honeycomb extrudate 115) from the extrusion die skin-forming die. Each of the skin slots 410, 610A, 610B, 810, 910, 1010, and 1110 can be manufactured by plunge EDM or other suitable machining process, such as turning.

The foregoing description discloses only example embodiments of the disclosure. Modifications of the above disclosed apparatus and methods which fall within the scope of the disclosure will be readily apparent to those of ordinary skill in the art. Accordingly, while the present disclosure has been described in connection with example embodiments thereof, it should be understood that other embodiments may fall within the scope of the disclosure, as defined by the claims.

What is claimed is:

1. A honeycomb extrusion die apparatus comprising: a skin-forming die body, a matrix die body, and a skin-forming mask;
    wherein the skin-forming die body has
        an inlet face,
        an outlet face,
        a central opening,
        a plurality of feed holes extending into the skin-forming die body from the inlet face to feed hole ends, and
        one or more skin-forming body slots, each skin-forming body slot extending through the skin-forming die body from a skin-forming body slot inlet, located at one of the feed hole ends, to the outlet face;
    wherein the matrix die body is disposed in the central opening at the center of the skin-forming die body about a longitudinal axis, and the matrix die body has a plurality of matrix feedholes and a plurality of matrix slots extending parallel to the longitudinal axis and in fluid communication with the plurality of matrix feedholes;
    wherein the skin-forming mask is in contact with the outlet face of the skin-forming die body;
    wherein a portion of the skin-forming mask is spaced away from a portion of the skin-forming die body such that the skin-forming mask and the skin-forming body are adapted to cooperatively form an outer channel surrounding the matrix die body;
    wherein the one or more skin-forming body slots comprise two or more concentric rings of skin-forming body slots;
    wherein the two or more concentric rings of slots comprise at least one inner slot and at least one outer slot, the at least one inner slot being disposed radially inward of the at least one outer slot, wherein the at least one inner slot intersects the outlet face of the skin-forming body at a first obtuse flow angle and the at least one outer slot intersects the outlet face of the skin-forming body at a second obtuse flow angle, the first flow angle and the second flow angle being measured with respect to an axis extending radially inward on the outlet face toward the longitudinal axis;
    wherein the first obtuse flow angle is less than the second obtuse flow angle.

2. The apparatus of claim 1, further comprising one or more divots in the one or more slots.

3. The apparatus of claim 2, wherein the one or more divots comprise a first portion located proximate one or more feedholes of the plurality of feedholes of the skin-forming die and a second portion located proximate the outlet face, wherein the first portion is wider than the second portion.

4. The apparatus of claim 3, wherein the second portion tapers from the first portion toward the outlet face.

5. The apparatus of claim 1, wherein the skin-forming body defines a narrowing portion in at least one of the skin-forming body slots.

6. The apparatus of claim 5, wherein the skin-forming body defines an expansion portion in at least one of the skin-forming body slots.

7. A skin-forming die body comprising:
    an inlet face, an outlet face,
        a central opening about a longitudinal axis,
        a plurality of feed holes extending into the skin-forming die body from the inlet face to feed hole ends, and
        one or more skin-forming body slots, each skin-forming body slot extending through the skin-forming die body from a skin-forming body slot inlet, located at one of the feed hole ends, to the outlet face.;
    wherein the one or more skin-forming body slots comprise two or more concentric rings of skin-forming body slots;
    wherein the two or more concentric rings of slots comprise at least one inner slot and at least one outer slot, the at least one inner slot being disposed radially inward of the at least one outer slot, wherein the at least one inner slot intersects the outlet face of the skin-forming body at a first obtuse flow angle and the at least one outer slot intersects the outlet face of the skin-forming body at a second obtuse flow angle, the first flow angle and the second flow angle being measured with respect to an axis extending radially inward on the outlet face toward the longitudinal axis;
    wherein the first obtuse flow angle is less than the second obtuse flow angle.

8. The skin-forming die body of claim 7, further comprising:
- a first plurality of feedholes of the plurality of feed holes coupled to first slots of the one or more skin-forming body slots in a first row, the first plurality of feedholes having a first transverse dimension; and
- a second plurality of feedholes of the plurality of feed holes coupled to second slots of the one or more skin-forming body slots in a second row, the second plurality of feedholes having a second transverse dimension, wherein the second transverse dimension is greater than the first transverse dimension.

9. The skin-forming die body of claim 7, further comprising one or more divots in the one or more slots.

10. The skin-forming die body of claim 9, wherein the one or more divots comprise a first portion located proximate one or more feedholes of the plurality of feedholes and a second portion located proximate the outlet face, wherein the first portion is wider than the second portion.

* * * * *